United States Patent Office 3,424,697
Patented Jan. 28, 1969

3,424,697
PROCESS FOR PREPARING CATALYSTS FOR THE ISOMERIZATION OF LOWER SATURATED HYDROCARBONS
Bruno Notari, San Donato Milanese, and Giovanni Manara, Savona, Italy, assignors to Snam S.p.A., Milan, Italy, a company of Italy
No Drawing. Filed Oct. 19, 1965, Ser. No. 498,114
Claims priority, application Italy, Nov. 3, 1964, 23,587/64
U.S. Cl. 252—430    3 Claims
Int. Cl. B01j 11/06

ABSTRACT OF THE DISCLOSURE

There is disclosed herein a catalyst for the isomerization at low temperatures of n-paraffins having 5 or 6 carbon atoms which is prepared by treating alumina that contains a small percentage, preferably 0.02% to 4% by weight, of platinum with the vapors which sublimate from hexachloroethane, the treatment being performed at a temperature between 180° C. and 500° C.

---

This invention relates to the treatment for isomerizing lower saturated hydrocarbons forming the most volatile fraction of gasolines. This fraction, which contains a significant aliquot of low-octane, straight-chain paraffins, is converted into a more valuable product by isomerization which gives rise to high-octane branched-chain paraffins.

As isoparaffins are thermodynamically stable at low temperatures, the catalysis processes based on the conventional catalysts, i.e. platinum catalysts supported by alumina having a chlorine content rating from 0.05% to 1.5% and whose working temperatures are between 400° C. and 500° C., permit, at the most, obtaining those concentrations of isoparaffins which are consistent with thermodynamic equilibrium within said temperature range, that is to say from 55% to 60%. Since the resultant compositions are unsatisfactory in that they still contain appreciable amounts of n-paraffins, these prior procedures require separation and recycling of the unreacted n-paraffins.

For these reasons those isomerization processes are more favourable in which low reaction temperatures are maintained, at which temperatures it is possible, at least in theory, to have isoparaffin concentration of 80%–90%, thus dispensing with separation and recycling steps.

These latter processes require catalysts having a high activity at rather low temperatures which, in practice, range between 100° C. and 150° C.

Catalysts adapted to effect isomerization in heterogeneous phase within the last-named temperature range generally consist of platinum supported on alumina and having a chlorine content generally over 8%. Since the capability of exerting a catalytic action at low temperatures upon the isomerization reactions is due to the chlorine content, it is necessary that said content should be maintained for the longest possible time, chlorine being present in said catalyst under the most suitable form.

The process for preparing catalysts for isomerizing in a heterogeneous phase and at low temperatures involve, as a general rule, treatment with chlorinating agents of platinum-based, alumina-supported reforming catalysts.

Such processes should ensure that the chlorine content in the isomerization catalyst thus obtained is high and is maintained for the longest possible time: they should moreover ensure that chlorine be distributed within the catalyst mass so as to afford high activity thereof.

A number of processes are known for preparing catalysts adapted for isomerization in a heterogeneous phase by impregnating with aluminum chloride a platinum-containing alumina, said aluminum chloride remaining virtually as such in the finished catalyst. Such catalysts contain a high amount of chlorine, up to 20%, but are open to the objection that they cannot be regenerated, this fact being a hindrance against their adoption on an industrial scale.

French Patent No. 1,310,818 claims a process of isomerization wherein the catalysts have been prepared by treating a platinum-containing alumina with a compound having the general formula:

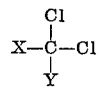

where X and Y can be equal or different and are selected from the group consisting of —H, —Cl, —Br, —F, —S—Cl and can represent, conjointly, oxygen or sulphur, under such conditions that chlorine is absorbed by alumina without producing free aluminum chloride.

Such treatment is adapted to give satisfactory isomerization catalysts, but has the disadvantage of operating with volatile agents which usually evolve very toxic decomposition products, more particularly phosgene.

It is thus desirable to be able to operate with less volatile and less hazardous chlorinating agents.

French Patent No. 1,322,457 claims an isomerization process with a catalyst prepared by contacting a platinum catalyst supported on alumina with an activating chlorinated agent selected from the group consisting of chloroalkanes and the chlorides of carboxylic acids having an atomic ratio of chlorine to carbon of at least 2 to 1.

It has been ascertained that a high chlorine content in the platinum-alumina composition is not, as and for itself, sufficient to render said composition an efficient catalyst. This fact can be ascertained from French Patent 1,322,457 from the circumstance that the treatment with monochloro-acetyl chloride succeeds in introducing into the platinum-alumina composition a very high amount of chlorine (13%); but the resultant composition has no catalytic activity for isomerization at low temperatures.

It has been moreover ascertained that an atomic ratio of chlorine to carbon of 2 to 1 or higher for the agent utilized in the treatment of platinum-alumina compositions is a necessary condition for those agents which have a single carbon atom, and that this condition, conversely, is insufficient for multi-carbon compounds.

Symmetrical tetrachloroethane and tetrachloroethylene, according to the French Patent No. 1,310,818 are inactive as treating agents for the preparation of isomerization catalysts starting from platinum-alumina compositions. It has been ascertained (see the examples) that pentachloroethane and asym. tetrachloroethane are just as inactive as the above indicated compounds, although the Cl to C ratio of these compounds is at least 2 to 1.

We have surprisingly ascertained that in the series of chlorinated hydrocarbons having two carbon atoms, the only useful compound for treating the platinum-alumina composition is hexachloroethane.

This solid compound, which sublimates at 187° C. has unexpectedly proven to be a first-class treating agent which permits preparing catalysts for isomerization reactions at low temperatures and displays a catalytic activity which can be compared to that of the catalysts prepared with single-carbon-atom agents.

By treating a platinum-alumina composition with vapors which sublimate out of hexachloroethane, an outstanding catalyst is prepared without resorting to cumbersome operations such as is the case with carbon tetrachloride and with single-carbon-atom chlorinated compounds.

The thusly prepared catalysts have quite desirable features such as long active life and the substantial elimination of cracking reactions which often accompany the conventional isomerization processes.

The treatment of the platinum-alumina compositions with vapors which sublimate from hexachloroethane allows the preparation of a catalyst into which the introduction of chlorine is uniform and constant, thus permitting avoiding any temperature gradient due to the exothermic reaction, the catalytic activity being evenly distributed throughout every portion of the catalyst.

This catalyst can still be easily regenerated, nor does it deteriorate by formation of aluminum chloride, neither during progress of its preparation nor in the course of the subsequent operations.

EXAMPLE 1

A high specific surface alumina containing 0.58% platinum and 0.8% chlorine is dehydrated by heating it at 300° C. for one hour under a nitrogen blanket of 300 volumes/volume/hour and is then treated for 5 hours at 190° C. under a pressure of 500 mms. of mercury with $PCl_5$ vapors. Upon completion of said reaction, a flow of nitrogen of 300 volumes/volume/hour is maintained at 190° C., whereafter cooling is allowed to take place, still under a nitrogen blanket.

The catalyst, which contains 16.8% chlorine, is tested under the following conditions for the isomerization of n-hexane.

|  | a | b |
|---|---|---|
| Tests: |  |  |
| Space-velocity of liquid per hour (HLSV) | 0.5 | 0.5 |
| Temperature, °C | 130 | 180 |
| Pressure, kgs./sq. cm | 20 | 20 |
| $H_2/Hc$ (volume ratio of hydrogen to the loaded hydrocarbon) | 2 | 2 |

|  | $C_1$-$C_3$, percent | i-$C_4$, percent | n-$C_4$ | i-$C_5$, percent | n-$C_5$ | 2,2-DMB [1] | 2 MP-3 MP,[1] 2,3-DMB, percent | n-$C_6$, percent |
|---|---|---|---|---|---|---|---|---|
| Reaction product: |  |  |  |  |  |  |  |  |
| a | 0.80 | 0.14 |  | 0.10 |  |  | 1.58 | 97.38 |
| b | 1.20 | 0.52 |  | 0.32 |  |  | 3.28 | 94.68 |

[1] DMB=Dimethylbutane; MP=Methylpentane.

EXAMPLE 2

A reforming catalyst consisting of alumina containing 0.58% platinum and 0.81% chlorine is heated at 300° C. for one hour under a nitrogen stream of 300 volumes/volume/hour. Vapors of dry pentachloroethane, admixed with dry nitrogen, are caused to pass over the catalyst maintained at 300° C., for 6 hours. Upon completion of this addition, the mass is maintained at 300° C. for one hour, and allowed to cool, still under a nitrogen stream at a rate of 300 volumes/volume/hour. A catalyst is obtained, having a chlorine content of 6.5%, which is employed for the isomerization of nor. hexane under the following conditions:

| | |
|---|---|
| HLSV | 0.5 |
| Temperature ° C | 140 |
| Pressure kgs./sq. cm | 25 |
| $H_2/Hc$ | 2 | and has given the following reaction product:

| | Percent |
|---|---|
| $C_1$-$C_3$ | 0.7 |
| i-$C_4$ | 0.20 |
| n-$C_4$ | ---- |
| i-$C_5$ | 0.15 |
| n-$C_5$ | ---- |
| 2:2–DMB [1] | ---- |
| 2 MP-3 MP,[1] 2:3–DMB | 1.15 |
| n-$C_6$ | 97.80 |

[1] The possibility of protracting the treatment with pentachloroethane has been tested: after 10 hours, the chlorine content was 5.2%, after 18 hours 5.7% and after 32 hours 5.4%.

EXAMPLE 3

Under the conditions of the previous example, vapors of sym. tetrachloroethane (1,1,2,2-tetrachloroethane) are caused to pass over the catalyst during 6 hours: a catalyst is obtained which has a chlorine content of 5.9% and, tested for the isomerization of n-hexane in the following conditions:

| | |
|---|---|
| HLSV | 0.41 |
| Temperature ° C | 130 |
| Pressure kgs./sq. cm | 18 |
| $H_2/Hc$ | 2.5 | has given the following reaction product:

| | Percent |
|---|---|
| $C_1$-$C_3$ | 0.72 |
| i-$C_4$ | 0.15 |
| n-$C_4$ | ---- |
| i-$C_5$ | 0.10 |
| n-$C_5$ | ---- |
| 2,2–DMB | ---- |
| 2 MP-3 MP, 2,3–DMB | 1.24 |
| n-$C_6$ | 97.79 |

EXAMPLE 4

The same procedure as in the previous example is followed, by employing vapors of asym. tetrachloroethane (1,1,1,3-tetrachloroethane). The catalyst thus obtained, having a chlorine content of 4.8%, gives, for the isomerization of n-hexane, the same results as in the previous example.

EXAMPLE 5

The same procedure as in the preceding examples is followed here, by employing vapors of 1,1,1-trichloroethane, and a catalyst is obtained, having a chlorine content of 4.1%, which, for the isomerization of nor. hexane, gives virtually the same results as in Example 3.

EXAMPLE 6

By employing asymmetrical dichloroethane (1,2-dichloroethane) as the chlorinating agent in the same conditions as in the previous examples, a catalyst is obtained, having a chlorine content of 4.55%, which, as employed in the isomerization of n-hexane (HLSV=0.5, temperature=140° C.; pressure=20 kgs./sq. cm.; $H_2/Hc$=2.5) leaves the latter virtually unaltered.

EXAMPLE 7

By employing 1,1,2-trichloroethane in the same conditions a catalyst is obtained, having a chlorine content of 4.25%, which, as employed in the isomerization of nor. hexane, under the conditions specified in Example 6, leaves the latter virtually unaltered.

EXAMPLE 8

Alumina, containing 0.8% chlorine and 0.6% platinum and having a specific surface higher than 350 sq. meters per gram, is heated for one hour at 250° C. under a nitrogen flow of 300 vols./vol./hr. Vapors of hexachloroethane are caused to pass over the catalyst still at 250° C. until chlorination is completed, which fact can be ascertained by the condensation of hexachloroethane at the outlet of the reaction duct. The mass is maintained during one hour at 250° C. under a nitrogen flow of 300 vols./ vol./hour and allowed to cool, still under a nitrogen stream.

The catayst thus obtained, with a chlorine content of 10.6%, is employed for the isomerization of nor. hexane under the following conditions:

| | |
|---|---|
| HLSV | 0.5 |
| Temperature °C | 135 |
| Pressure kgs./sq. cm | 20 |
| $H_2/Hc$ | 2 |

The reaction product thus obtained analyzes:

| | $C_1$-$C_3$, percent | i-$C_4$, percent | n-$C_2$, percent | i-$C_5$, percent | n-$C_5$, percent | 2,2 DMB, percent | 2 MP-3 MP 2,3 DMB, percent | n-$C_6$, percent |
|---|---|---|---|---|---|---|---|---|
| After 17 hrs | 0.22 | 0.92 | Traces | 0.63 | 0.08 | 33.50 | 57.31 | 7.34 |
| After 59 hrs | 0.28 | 1.10 | 0.10 | 0.71 | 0.12 | 32.66 | 57.92 | 7.11 |

EXAMPLE 9

The catalyst prepared as in Example 8, with a chlorine content of 11.4,% is employed under the following conditions:

| | |
|---|---|
| HLSV | 0.5 |
| Temperature °C | 135 |
| Pressure kgs./sq. cm | 20 |
| $H_2/Hc$ | 2 | and gave the following results as tabulated below, the initial charge and the final product being both reported therein:

EXAMPLE 10

A catalyst similar to those of the preceding Examples 8 and 9 and having a chlorine content of 11.7% has been employed for the isomerization of nor. pentane under the following conditions:

| | |
|---|---|
| HLSV | 0.5 |
| Temperature °C | 135 |
| Pressure kgs./sq. cm | 20 |
| $H_2/Hc$ | 2.5 |

The isomer thus obtained had the following composition:

| | $C_1$-$C_3$, percent | i-$C_4$, percent | n-$C_4$, percent | i-$C_5$, percent | n-$C_5$, percent | 2,2 DMB, percent | 2 MP-3 MP 2,3 DMB, percent | n-$C_6$ |
|---|---|---|---|---|---|---|---|---|
| After 50 hrs | 0.15 | 1.88 | 0.24 | 80.78 | 16.23 | 0.38 | 0.34 | Traces. |
| After 70 hrs | 0.35 | 1.55 | 0.28 | 80.14 | 16.89 | 0.35 | 0.44 | Do. |
| After 150 hrs | 0.25 | 1.70 | 0.20 | 80.40 | 16.75 | 0.30 | 0.40 | Do. |
| After 250 hrs | 0.20 | 1.70 | 0.15 | 80.30 | 16.90 | 0.30 | 0.45 | Do. |

The embodiments of the invention in which an exclusive property or privilege is claimed are defined as follows:

1. A catalyst, for the isomerization at low temperatures of n-paraffins selected from the group having 5 or 6 carbon atoms, prepared by treating an alumina supported platinum catalyst with the vapors which sublimate from hexachloroethane, the alumina being first heated, and said vapors being passed over the heated alumina.

2. A catalyst, as claimed in claim 1, wherein the platinum is present in the catalyst in an amount between 0.2% and 4% by weight.

3. A catalyst as claimed in any one of claims 1 and 2 in which the treatment with said vapors is performed at a temperature between 180° C. and 500° C.

| | $C_1$-$C_3$, percent | i-$C_4$, percent | n-$C_4$, percent | i-$C_5$, percent | n-$C_5$, percent | Cyclo $C_5$, percent | 2,2 DMB, percent | 2,3 DMB 2 MP, percent | 3 MP, percent | n-$C_6$, percent | Methyl-cyclo-pentane, percent | Cyclo-hexane, percent |
|---|---|---|---|---|---|---|---|---|---|---|---|---|
| Initial charge | | 0.05 | 5.70 | 17.90 | 33.43 | 1.30 | 0.10 | 10.55 | 6.00 | 23.52 | 1.05 | 0.40 |
| Product | 0.20 | 0.55 | 5.15 | 35.72 | 16.01 | 1.17 | 11.42 | 18.23 | 7.45 | 2.76 | 0.95 | 0.39 |

References Cited

UNITED STATES PATENTS 3,248,320  4/1966  White et al. \_\_\_\_ 260—683.68 XR

FOREIGN PATENTS 1,322,457  2/1963  France.

PATRICK P. GARVIN, *Primary Examiner.*

U.S. Cl. X.R.

252—442; 260—683.68, 683.75

UNITED STATES PATENT OFFICE
CERTIFICATE OF CORRECTION

Patent No. 3,424,697                        January 28, 1969

Bruno Notari et al.

It is certified that error appears in the above identified patent and that said Letters Patent are hereby corrected as shown below:

Column 6, lines 42 and 43, "in an amount between 0.2% and 4% by weight" should read -- in an amount between 0.02% and 4% by weight --.

Signed and sealed this 5th day of January 1971.

(SEAL)
Attest:

Edward M. Fletcher, Jr.                     WILLIAM E. SCHUYLER, JR.
Attesting Officer                              Commissioner of Patents